United States Patent
Suthar et al.

(10) Patent No.: US 11,449,748 B2
(45) Date of Patent: Sep. 20, 2022

(54) MULTI-DOMAIN SERVICE ASSURANCE USING REAL-TIME ADAPTIVE THRESHOLDS

(71) Applicant: Cisco Technology, Inc., San Jose, CA (US)

(72) Inventors: Om Prakash Suthar, Bolingbrook, IL (US); Anwin P. Kallumpurath, Shrewsbury, MA (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1000 days.

(21) Appl. No.: 16/172,724

(22) Filed: Oct. 26, 2018

(65) Prior Publication Data

US 2020/0134441 A1 Apr. 30, 2020

(51) Int. Cl.
| | |
|---|---|
| *G06F 9/50* | (2006.01) |
| *G06N 3/08* | (2006.01) |
| *G06K 9/62* | (2022.01) |
| *G06F 11/34* | (2006.01) |
| *G06F 17/18* | (2006.01) |

(52) U.S. Cl.
CPC ................. *G06N 3/08* (2013.01); *G06F 9/50* (2013.01); *G06F 11/3466* (2013.01); *G06F 17/18* (2013.01); *G06K 9/6256* (2013.01)

(58) Field of Classification Search
CPC ....................................................... G06F 9/50
See application file for complete search history.

(56) References Cited

U.S. PATENT DOCUMENTS

| | | | |
|---|---|---|---|
| 7,076,695 B2 | 7/2006 | McGee et al. | |
| 9,294,946 B2 | 3/2016 | Shuman et al. | |
| 2005/0128201 A1* | 6/2005 | Warner | ................... G06T 19/00 345/474 |
| 2007/0038970 A1* | 2/2007 | DeMaris | ................... G03F 1/36 716/51 |
| 2008/0247325 A1* | 10/2008 | Vaitaitis | .............. H04L 43/0858 370/252 |

(Continued)

OTHER PUBLICATIONS

Bikramjot Singh Hanzra, "Adaptive Thresholding," HanzraTech, Jan. 21, 2015, 8 pages.

(Continued)

*Primary Examiner* — Jae U Jeon

(74) *Attorney, Agent, or Firm* — Patterson + Sherdan, LLP

(57) ABSTRACT

Techniques for adaptive thresholding are provided. First and second data points are received. A plurality of data points are identified, where the plurality of data points corresponds to timestamps associated with the first and second data points. At least one cluster is generated for the plurality of data points based on a predefined cluster radius. Upon determining that the first data point is outside of the cluster, the first data point is labeled as anomalous. A predicted value is generated for the second data point, based on processing data points in the cluster using a machine learning model, and a deviation between the predicted value and an actual value for the second data point is computed. Upon determining that the deviation exceeds a threshold, the second data point is labeled as anomalous. Finally, computing resources are reallocated, based on at least one of the anomalous data points.

20 Claims, 7 Drawing Sheets

(56) References Cited

U.S. PATENT DOCUMENTS

2016/0267397 A1* 9/2016 Carlsson ................ G06N 5/025
2018/0046936 A1* 2/2018 Wang ..................... G06N 20/10
2019/0236177 A1* 8/2019 Jain ........................ G06F 17/18

OTHER PUBLICATIONS

Ensuring Success with Splunk ITSI—Part 1:Thresholding Basics, 12 pages [Accessed Online Oct. 4, 2018] <https://www.splunk.com/blog/2017/12/15/ensuring-success-with-itsi-threshold-and-alert-configurations.html>.
Ensuring Success with Splunk ITSI—Part 3: AdaptiveThresholding [Accessed Online Oct. 4, 2018] <https://www.splunk.com/blog/2018/01/16/ensuring-success-with-itsi-threshold-and-alert-configurations-part-2-adaptive-thresholding.html>.
Ensuring Success with Splunk ITSI—Part 2: AdaptiveThresholding [Accessed Online Oct. 4, 2018] <https://www.splunk.com/blog/2017/12/21/ensuring-success-with-splunk-itsi-part-2-alerting-basics.html>.

* cited by examiner

MULTI-DOMAIN SERVICE ASSURANCE USING REAL-TIME ADAPTIVE THRESHOLDS

TECHNICAL FIELD

Embodiments presented in this disclosure generally relate to adaptive thresholding. More specifically, embodiments disclosed herein provide techniques for dynamic monitoring of streaming and batch data utilizing machine learning models.

BACKGROUND

As data systems become increasingly complex, additional data monitoring and analysis is required to ensure adequate performance. This is particularly true with respect to service providers that manage complex networks consisting of physical, virtual, and hybrid machines and workloads. Further, increased horizontal and vertical integration introduces additional complexities. Service assurance involves procedures utilized to optimize performance of a product or service, such as a communications network. In order to provide sufficient service to users, a large variety of data is collected and monitored, so that the state of the network can be understood in each locale and at each time. However, existing solutions utilize predefined thresholds which fail to adjust to trends, and cannot account for a "new normal" in the network in real-time. Adjustments to the monitoring must be made manually, which reduces their efficacy and allows network performance to degrade due to poor oversight and poor understanding of network trends.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
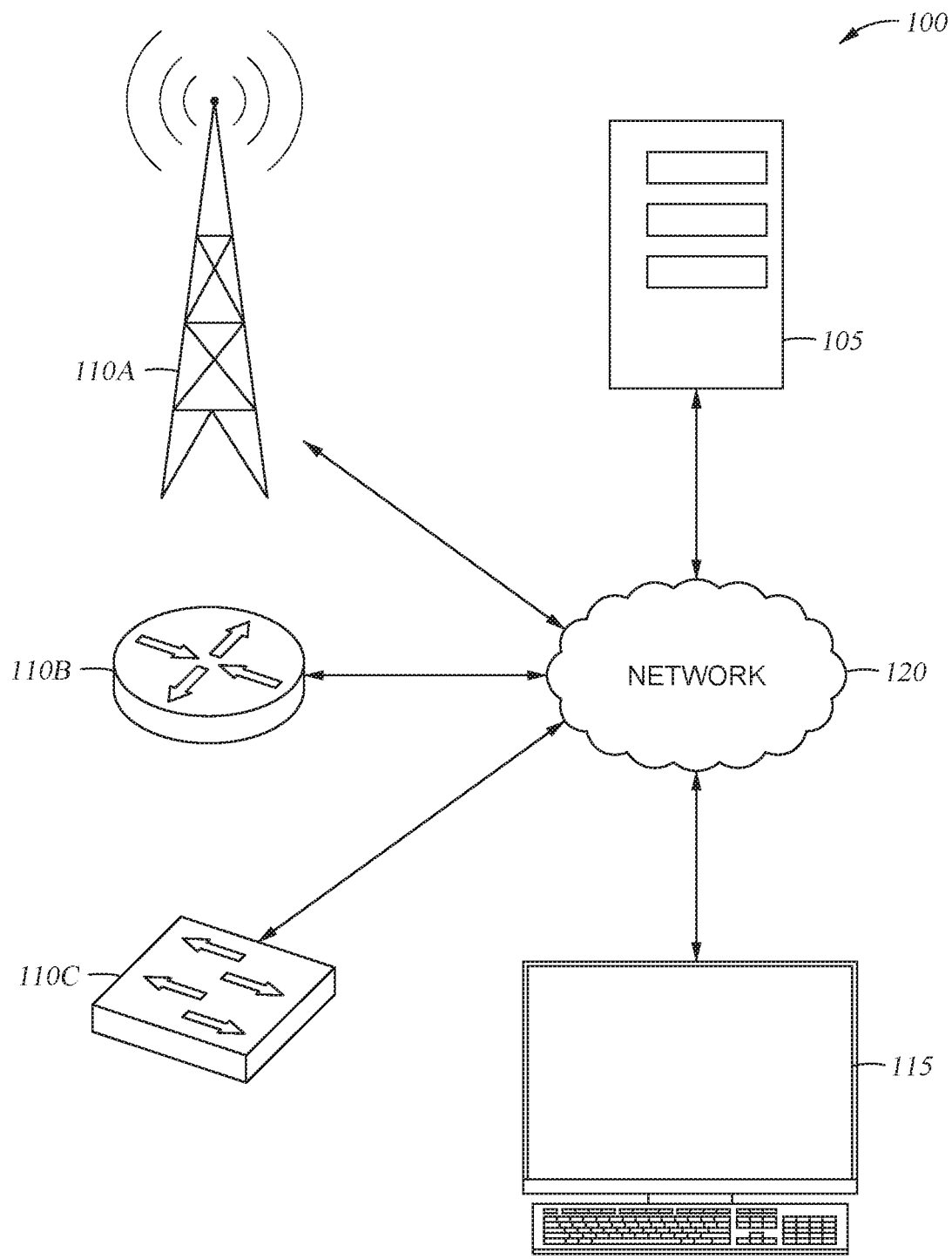
FIG. 1 illustrates a system configured for monitoring streaming and batch data utilizing real-time adaptive thresholds, according to one embodiment disclosed herein.

According to one embodiment presented in this disclosure, a method is provided. The method includes receiving a first data point and a second data point in a data stream, and identifying a first plurality of data points from the data stream, wherein the first plurality of data points corresponds to a timestamp associated with the first data point and a timestamp associated with the second data point. Additionally, the method includes generating at least a first cluster for the first plurality of data points based on a predefined cluster radius. Upon determining that the first data point is outside of the first cluster, the method includes labeling the first data point as anomalous. Further, the method includes generating a predicted value for the second data point, based on processing data points in the first cluster using a first machine learning model, and computing a deviation between the predicted value for the second data point and an actual value for the second data point. Upon determining that the deviation exceeds a first predefined threshold, the method also includes labeling the second data point as anomalous. Finally, the method includes facilitating reallocation of computing resources, based on at least one of (i) labeling the first data point as anomalous, or (ii) labeling the second data point as anomalous.

According to a second embodiment presented in this disclosure, a computer program product is provided. The computer program product comprises a computer-readable storage medium having computer-readable program code embodied therewith, the computer-readable program code executable by one or more computer processors to perform an operation. The operation includes receiving a first data point and a second data point in a data stream, and identifying a first plurality of data points from the data stream, wherein the first plurality of data points corresponds to a timestamp associated with the first data point and a timestamp associated with the second data point. Additionally, the operation includes generating at least a first cluster for the first plurality of data points based on a predefined cluster radius. Upon determining that the first data point is outside of the first cluster, the operation includes labeling the first data point as anomalous. Further, the operation includes generating a predicted value for the second data point, based on processing data points in the first cluster using a first machine learning model, and computing a deviation between the predicted value for the second data point and an actual value for the second data point. Upon determining that the deviation exceeds a first predefined threshold, the operation also includes labeling the second data point as anomalous. Finally, the operation includes facilitating reallocation of computing resources, based on at least one of (i) labeling the first data point as anomalous, or (ii) labeling the second data point as anomalous.

According to a third embodiment presented in this disclosure, a system is provided. The system comprises one or more computer processors and a memory containing a program which when executed by the one or more computer processors performs an operation. The operation includes receiving a first data point and a second data point in a data stream, and identifying a first plurality of data points from the data stream, wherein the first plurality of data points corresponds to a timestamp associated with the first data point and a timestamp associated with the second data point. Additionally, the operation includes generating at least a first cluster for the first plurality of data points based on a predefined cluster radius. Upon determining that the first data point is outside of the first cluster, the operation includes labeling the first data point as anomalous. Further, the operation includes generating a predicted value for the second data point, based on processing data points in the first cluster using a first machine learning model, and computing a deviation between the predicted value for the second data point and an actual value for the second data point. Upon determining that the deviation exceeds a first predefined threshold, the operation also includes labeling the second data point as anomalous. Finally, the operation includes facilitating reallocation of computing resources, based on at least one of (i) labeling the first data point as anomalous, or (ii) labeling the second data point as anomalous.

EXAMPLE EMBODIMENTS

Embodiments of the present disclosure provide for dynamic adjustment and adaptation of data thresholds by providing techniques to learn trends in the data, adjust to a "new" normal state of the data, and providing a consolidated view to enable intelligent operations decisions. Techniques disclosed herein provide self-optimizing technologies that allow networks to become smarter and more resilient. Service providers today often have infrastructure and applications spread across any number of geographic areas, which causes difficulties correlating and monitoring potentially millions of alerts and alarms. Thus, embodiments of the present disclosure allow for improved action plans and monitoring.

Embodiments of the present disclosure can be applied for streaming data and batch data. In a batch data embodiment, a full data-set may be available for processing. In contrast, in streaming embodiments, data is received one data point at a time, which requires processing and learning with each data point in order to provide adaptive thresholding. Embodiments of the present disclosure provide for processing data points based on adaptive thresholds through clustering and application of machine learning to data points as they are received, in order to dynamically identify anomalous data. In some embodiments, techniques are provided for data cleansing and smoothing, which can improve the accuracy of the regression models utilized to identify anomalous data based on dynamic thresholds.

In one embodiment of the present disclosure, data is collected from a variety of data sources. In the present disclosure, networking telemetry and data is discussed as an example embodiment. These examples are not intended to be limiting, and embodiments provided herein can be applied to any system or implementation that involves monitoring of data to identify anomalous data points. In one embodiment, data points are received and cleansed. In an embodiment, cleansing the data involves identifying missing or erroneous data values, and inserting predicted values based on one or more regression models. In some embodiments, the data is further smoothed by removing outliers. In some embodiments, these outliers are flagged as anomalous. In an embodiment, the data is then clustered to identify anomalous values, and one or more machine learning models are applied to further identify irregular or abnormal data.

In embodiments of the present disclosure, anomalous data is identified based on adaptive thresholds that are adjusted in real-time, based in part on the normal state of the network. This allows for improved service assurance, as administrators can more readily determine whether the data is, in fact, anomalous, and can more efficiently allocate network resources to address anomalous data (without overacting to ordinary spikes in network traffic). Further, embodiments disclosed herein enable such monitoring across multiple domains (e.g., across multiple sites or locations, as well as at various levels of the network and based on any number of distinct performance indicators). In this way, embodiments of the present disclosure improve the stability and efficiency of the network.

FIG. 1 illustrates a system 100 configured for monitoring streaming and batch data utilizing real-time adaptive thresholds, according to one embodiment disclosed herein. In the illustrated embodiment, a number of Network Devices 110A-C act as data sources. As illustrated, these Network Devices 110A-C transmit telemetry and other data regarding the performance of the network (and of each respective Network Device 110A-C) to a Data Processing Device 105 via the Network 120. Although illustrated as a single device, in embodiments, the Data Processing Device 105 can represent any number of devices, and may involve physical hardware, virtual workloads, as well as a mixture of both software and hardware.

Additionally, the illustrated embodiment includes a User Terminal 115. In an embodiment, one or more users or administrators can utilize User Terminals 115 to monitor the status of the system via the Data Processing Device 105, and/or to configure Network Devices 110A-C. In the illustrated embodiment, the Network Devices 110 include one or more radio devices 110A (e.g., cellular radio, WiFi devices, long range radio devices (e.g., LoRa), and the like. The illustrated embodiment also includes any number of routers and switches 110B and 110C. In embodiments, any data source can be utilized.

In one embodiment, the data can include data collected from radio devices, transport devices or services (e.g., backhaul, IP core, WAN), datacenters (such as from software-defined networking (SDN) controllers), gateways, applications such as domain name systems (DNS), dynamic host configuration protocol (DHCP) data, and the like. In a networking embodiment, examples of the types of data to be collected can include capacity data, performance data, parameter audit data, traffic balancing data, telemetry, alerts and faults data, routing policy data, deep and shallow inspections, bandwidth utilization data, application performance, application faults, compute utilization, storage utilization, and the like.

In an embodiment, the data includes key performance indicators (KPIs), which are quantifiable measures of the current state of the system. In one embodiment, the Data Processing Device 105 receives data points from each data source, and processes it based on adaptive thresholds for each respective KPI. In embodiments, the thresholds utilized dynamically and automatically adjust based on trends and patterns in the KPI values, in order to ensure adequate monitoring. That is, embodiments of the present disclosure can prevent data points from being erroneously flagged as anomalous or non-anomalous, based on the current state of the network and a learned history of the network. In an embodiment, anomalous data is flagged and an alert or indication is provided to a user or administrator (such as via one or more User Terminals 115). This allows for more intelligent monitoring and maintenance of the system.

Figure 2:
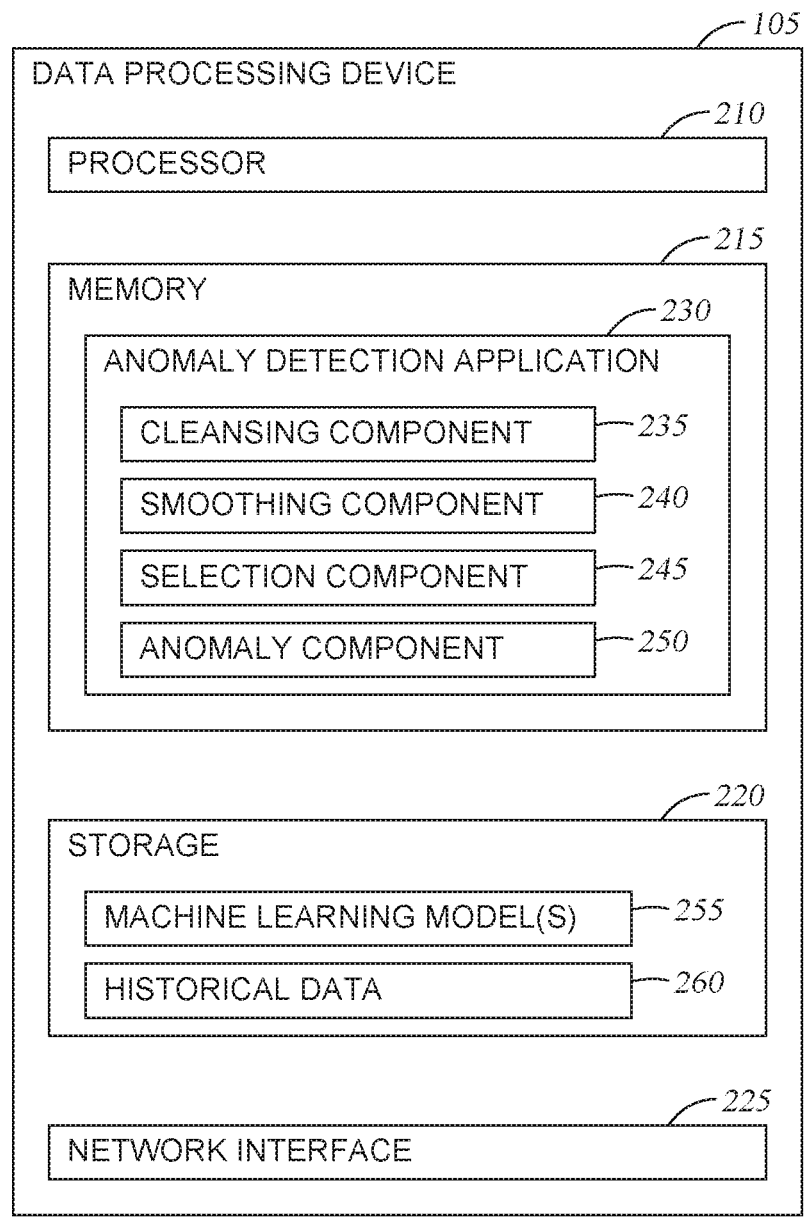
FIG. 2 is a block diagram illustrating a data processing device configured to determine and apply adaptive thresholds in real-time, according to one embodiment disclosed herein.

FIG. 2 is a block diagram illustrating a Data Processing Device 105 configured to determine and apply adaptive thresholds in real-time, according to one embodiment disclosed herein. As illustrated, the Data Processing Device 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Data Processing Device 105 may be communicatively coupled with other devices, such as external databases, data sources, user terminals, and the like.

In the illustrated embodiment, the Storage 220 includes one or more Machine Learning Models 255. In an embodiment, the Machine Learning Models 255 include one or more regression models. In one embodiment, the Machine Learning Models 255 include one or more neural networks, such as a recurrent neural network (RNN), which may include one or more long short-term memory (LSTM) units. In one embodiment, one or more Machine Learning Models 255 are trained for each KPI that is monitored by the Data Processing Device 105, as discussed in more detail below. In one embodiment, each data stream corresponds to a particular KPI, and each data stream is therefore processed separately. In the illustrated embodiment, the Storage 220 also includes Historical Data 260. In an embodiment, the Historical Data 260 includes previous data points for one or more KPIs. In one embodiment, the Historical Data 260 is used to help process new data points. In embodiments, the Historical Data 260 can data points covering any period of time. For example, in one embodiment, a user or administrator may define a period of time for which the Historical Data 260 should be stored and used. In some embodiments, this period of time differs between KPIs. In one embodiment, only Historical Data 260 within one or more predefined windows of time is used for processing each new data point.

As illustrated, the Memory 215 includes an Anomaly Detection Application 230. As depicted, the Anomaly Detection Application 230 includes a Cleansing Component 235, a Smoothing Component 240, a Selection Component 245, and an Anomaly Component 250. Although illustrated as distinct components to aid understanding, in embodiments, the functionality and operations of each component can be combined or distributed across any number of components. Further, in embodiments, each component may be implemented using software, hardware, or a combination of software and hardware.

In the illustrated embodiment, the Cleansing Component 235 receives data points (such as in batch data, or in a data stream), identifies missing data points, and provides a value for such missing data, as discussed below in more detail. In an embodiment, this enables more accurate and complete training of the Machine Learning Models 255, which can ensure the data monitoring is sufficiently precise.

In an embodiment, the Smoothing Component 240 similarly receive data points (which may have already undergone cleansing), and normalizes the data values (or the change in data values) between data points. For example, in one embodiment, the Smoothing Component 240 analyzes the rate of change in the data values between data points, and removes or flags data points that exceed a predefined threshold, as discussed in more detail below.

In the illustrated embodiment, the Selection Component 245 is utilized to select particular data points and/or features for training each Machine Learning Model 255. In one embodiment, the various time granularities (e.g., time of day, day of the week, weekends or weekdays, etc.) serve as parameters or features to be selected or deselected. In one embodiment, the Selection Component 245 utilizes one or more filter methods, which involve applying statistical measures to assign a score for each feature. The features can then be ranked based on this score, and selected or excluded from the data set. In another embodiment, the Selection Component 245 utilizes a wrapper method, which involves preparing, evaluating, and comparing different combinations of features. A predictive model can then be used to evaluate the combinations of features and a score is assigned for model accuracy. In yet another embodiment, the Selection Component 245 utilizes an embedded method, which involves learning which features best contribute to model accuracy, while the model is being created.

In an embodiment, the Selection Component 245 selects/filters the data points based on predefined intervals of time. For example, a predefined interval may specify that the relevant Historical Data 260 at any given point in time includes data collected at the same time of day at which the data point was recorded. In one such embodiment, the Selection Component 245 tracks values for each KPI at each point in time over the last N days, where N is defined by a user or administrator. In an embodiment, the Selection Component 245 determines the minimum, maximum, and average value for each KPI at the specified time, over the last N days. In some embodiments, the Selection Component 245 also computes the standard deviation of the values. For example, in such an embodiment, a value of each KPI at 9:00 am can be determined for the last 14 days, and these values can be aggregated to better understand the data trends at the specified time.

In some embodiments, the Selection Component 245 also utilizes a predefined interval between days, in addition to or instead of considering an interval between points in time. For example, in an embodiment, the Selection Component 245 considers the day of the week during which the data was recorded (e.g., an interval of seven days, or one week). In some embodiments, this interval is similarly specified by a user or administrator. For example, in such an embodiment, the Selection Component 245 may utilize data gathered at a specified time (e.g., 9:00 am), on a specified day (e.g., Sunday), over a specified number of days/intervals (e.g., over the last five weeks). In one embodiment, the Selection Component 245 similarly computes the minimum, maximum, average, standard deviation, and/or percentiles for these data points.

Further, in some embodiments, the Selection Component 245 considers whether the data was recorded during a weekday (e.g., Monday, Tuesday, Wednesday, Thursday, or Friday) or weekend (e.g., Saturday or Sunday). Similarly, in one embodiment, the Selection Component 245 considers whether it is a weeknight (e.g., Sunday, Monday, Tuesday, Wednesday, or Thursday afternoon/evening), or not (e.g., Friday and Saturday afternoon or evening). In an embodiment, the Selection Component 245 further determines the minimum, maximum, average, standard deviation, and/or percentiles for these data points in the defined windows of time.

Advantageously, by utilizing these various granularities, the Selection Component 245 can focus the training and use of the Machine Learning Models 255 to the data that is most relevant for newly received data points. For example, in one embodiment, each Machine Learning Model 255 is trained based on data corresponding to one or more identified intervals of time and/or intervals of dates (e.g., each model corresponds to a particular time and/or day of the week). In such an embodiment, when a new data point is received, the Selection Component 245 determines which Machine Learning Model(s) 255 to select based on the time of day and/or day of the week associated with the data.

In the illustrated embodiment, the Anomaly Component 250 analyzes newly received data points, such as with one or more Machine Learning Models 255, to determine whether the data point is anomalous or not. In one embodiment, the Anomaly Component 250 utilizes a combination of clustering and machine learning to analyze each new data point, as discussed in more detail below. In embodiments, the Anomaly Component 250 utilizes adaptive thresholds which automatically adjust based on the trends and Historical Data 260, in order to prevent erroneous classification of the data.

Figure 3:
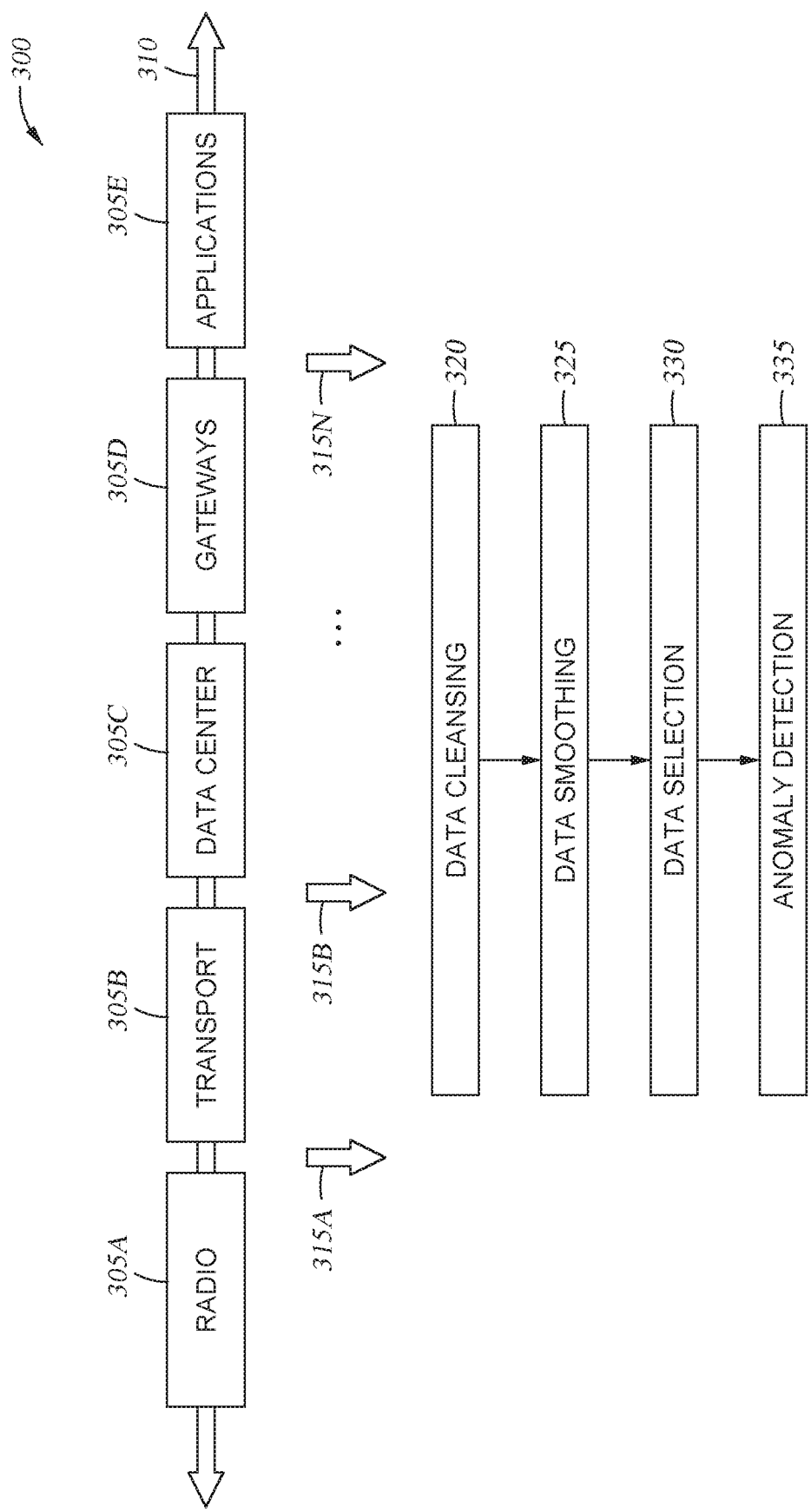
FIG. 3 illustrates a workflow for data collection and analysis utilizing real-time adaptive thresholds, according to one embodiment disclosed herein.

FIG. 3 illustrates a workflow 300 for data collection and analysis utilizing real-time adaptive thresholds, according to one embodiment disclosed herein. In the illustrated workflow 300, a variety of Data Sources 305A-E provide the data to be analyzed. For example, in the illustrated embodiment, the Data Sources 305 include data sources for Radio 305A, Transport 305B, Datacenters 305C, Gateways 305D, and Applications 305E. As illustrated by the arrow 310, however, these example Data Sources 305 are not intended to be limiting, and any number of other data sources may be utilized in various embodiments.

In the illustrated embodiment, the data is collected via one or more Data Pipes 315A-N. These Data Pipes 315 can capture data from any data source (and data of any type), and automate the process of collecting the data. In embodiments, the Data Pipes 315 further facilitate the storage, management, and transport of the data points from each Data Source 305. In the illustrated embodiment, the data points proceed through the Data Pipes 315 to a step for Data Cleansing 320. In one embodiment, the block 320 is performed by the Cleansing Component 235. Frequently, data may be missing or inaccurate in some instances. This is particularly true in network operations scenarios, where raw data (such as telemetry or counters) can be missing or lost during transmission.

In an embodiment, the Data Cleansing 320 involves detecting missing and/or inconsistent time-series data, which can skew the data set. In one embodiment, the Data Cleansing 320 is performed via a Holt-Winters algorithm, to compute a predicted value for the missing data. This predicted data point can then be inserted into the data stream or batch data. In one embodiment, the predicted data point is also associated with a timestamp corresponding to the missing data, in order to mitigate the discontinuity in the received data points.

In the illustrated embodiment, the data then proceeds to a step for Data Smoothing 325. In one embodiment, the Data Smoothing 325 is performed by the Smoothing Component 240. In an embodiment, the Data Smoothing 325 ensure that outliers are removed from the data set, and only nominal values are passed to the machine learning algorithms (e.g., to the Machine Learning Models 255). This helps to ensure that the models accurately represent the nominal state of the system. In one embodiment, Data Smoothing 325 utilizes an iterative method for estimating a mathematical model to identify outliers. In some embodiments, this model can include a simple low pass filter, or a Kalman filter. In one embodiment, the Data Smoothing 325 involves analysis of the rate of change in the data values between each data point. In other embodiments, the Data Smoothing 325 can include min-max normalization, Z-score normalization, and the like.

In the illustrated workflow 300, once the Data Smoothing 325 is completed, the data proceeds to a stage for Data Selection 330. In one embodiment, this stage is completed by the Selection Component 245. As discussed above, in an embodiment, the Data Selection 330 involves identifying and removing unneeded, irrelevant, and redundant attributes, parameters, and features from the data. In one embodiment, these features do not contribute to the accuracy of the predictive model, and may in fact decrease the accuracy of the model. In some embodiments, the Data Selection 330 includes selecting intervals of time and/or dates (e.g., times of day and/or days of the week) for processing.

As illustrated, the selected data then proceeds to a stage for Anomaly Detection 335. In an embodiment, this Anomaly Detection 335 is performed by the Anomaly Component 250. As discussed in more detail below, in an embodiment, the Anomaly Detection 335 includes clustering the data points to identify anomalous data. In some embodiments, the Anomaly Detection 335 further includes applying one or more Machine Learning Models 255 to identify anomalous data. For example, in one embodiment, a Machine Learning Model 255 is used to generate a predicted value for each data point, and this value is compared to the actual value of the data point, as discussed in more detail below.

Figure 4:
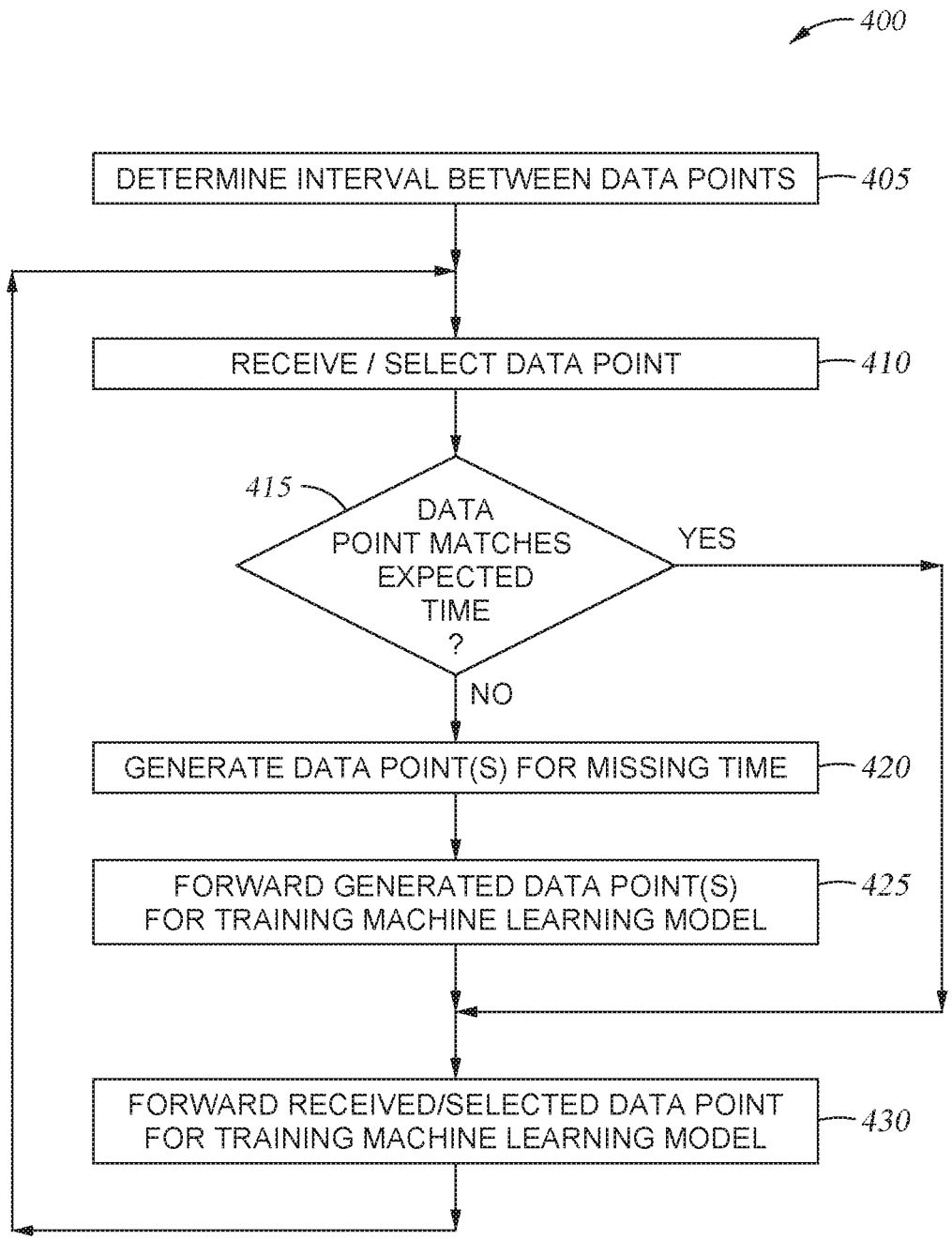
FIG. 4 is a flow diagram illustrating a method of cleansing data used to process data points based on adaptive thresholds, according to one embodiment disclosed herein.

FIG. 4 is a flow diagram illustrating a method 400 of cleansing data used to process data points based on adaptive thresholds, according to one embodiment disclosed herein. In an embodiment, the method 400 is performed separately for each KPI. For example, in an embodiment, the data points received by the Anomaly Detection Application 230 are sorted and processed separately based on the KPI they correspond to. In embodiments, the method 400 can be utilized with batch data environments, and/or streaming data implementations. In a batch data embodiment, the Cleansing Component 235 receives multiple data points simultaneously, and processes each of them. In a data stream environment, the Cleansing Component 235 receives data points sequentially, and processes them as they are received. In some streaming data implementations, the Cleansing Component 235 receives data points sequentially, and store them in a data lake until a predefined number of points have been collected, or a predefined time has passed. At that point, the Cleansing Component 235 can proceed as in a batch data embodiment.

The method 400 begins at block 405, where the Cleansing Component 235 determines the time interval between data points. For example, in a batch data implementation, the Cleansing Component 235 may analyze timestamps associated with one or more received data point in the batch, to determine a nominal amount of time that elapses between each. Similarly, in a streaming environment, the Cleansing Component 235 can compare the time stamp of each received data point to one or more previously-received data points, to determine the normal interval. The method 400 then proceeds to block 410, where the Cleansing Component 235 receives or selects a data point. For example, in a batch data embodiment, the Cleansing Component 235 selects one of the data points in the batch. Conversely, in a data streaming embodiment, the Cleansing Component 235 receives the next data point in the time series.

The method 400 then proceeds to block 415, where the Cleansing Component 235 determines whether the timestamp associated with the selected/received data point matches with the expected timestamp for the next data point. For example, in an embodiment, the Cleansing Component 235 may determine, for each selected or received data point, a corresponding timestamp. This timestamp can then be incremented by the determined interval, to determine the expected timestamp of the next data point. When the next data point is received or selected at block 410, the Cleansing Component 235 determines the associated timestamp, and compares this with the generated expected timestamp. In an embodiment, the timestamp of a data point corresponds to the time at which the data was recorded or collected at the data source.

In one embodiment, determining whether the timestamps match comprises determining whether the timestamps are within a predefined threshold (e.g., whether the difference between the actual timestamp and the expected timestamp is below a defined threshold). If the current timestamp matches the expected timestamp, the method 400 proceeds to block 430, where the received/selected timestamp is forwarded for use in training or refining one or more Machine Learning Models 255, discussed in more detail below. In one embodiment, smoothing the data removes outliers from the data, and thus provides improved data for training. In an embodiment, the smoothed data is provided to the selected machine learning model(s) for training. If, at block 415, the Cleansing Component 235 determines that the received/selected data point does not match the expected timestamp, the method 400 proceeds to block 420. In embodiments, the timestamps may not align because, for example, one or more missing data points were lost or misrouted during transmission, or were never collected by the data source/pipe (e.g., because of unexpected load, downtime, and the like).

At block 420, the Cleansing Component 235 generates a value and data point for the missing data point(s). That is, in an embodiment, the Cleansing Component 235 determines whether a single data point is missing, or whether multiple data points are missing, based on the timestamp of the current data point. In the illustrated embodiment, the Cleansing Component 235 utilizes one or more Machine Learning Models 255 to estimate or predict a value for each missing data point. In one embodiment, the Machine Learning Models 255 utilize linear regression. In some embodiments, the Machine Learning Models 255 are trained using In one embodiment, the Cleansing Component 235 generates the missing data based on one or more prior data points in the time series. For example, if the missing data point is at $t_n$, the Cleansing Component 235 generates a value for time $t_n$ based on utilizing one or more linear regression models with one or more prior data points (from the same time series as the missing data) from time $t_m$ to time $t_{n-1}$. In an embodiment, time $t_m$ is selected by a user or administrator, to control the number of samples/data points that are considered. In another embodiment, the user or administrator selects the number of data points to utilize, and the Cleansing Component 235 determines $t_m$ based on this number and the determined interval.

Once this predicted value is generated, the Cleansing Component 235 generates a new data point, assigns the predicted value to this data point, and associates the timestamp of the missing data with the new data point. In an embodiment, this process is repeated for each missing data point in the identified interval of missing data. The method 400 then proceeds to block 425, where the Cleansing Component 235 forwards each generated data point to be used in training or refining one or more Machine Learning Models 255. Once the generated data points have been transmitted, the method 400 proceeds to block 430, where the received/selected data point is also sent for use with one or more Machine Learning Models 255.

In this way, by cleansing the data prior to use, the models can be more accurate and useful, because the training data for subsequent models does not have discontinuity or gaps in the data. In one embodiment, the Machine Learning Models 255 are refined or trained for each new data point, in order to ensure the models remain current and accurate. The method 400 then returns to block 410, to receive/select the next data point. In a batch data environment, this process may iterate until all of the data points have been processed. In a streaming environment, the process may iterate until the data source(s) stop transmitting data, or until some other defined criteria indicate that the Anomaly Detection Application 230 is to stop processing or analyzing the identified data stream(s).

Figure 5:
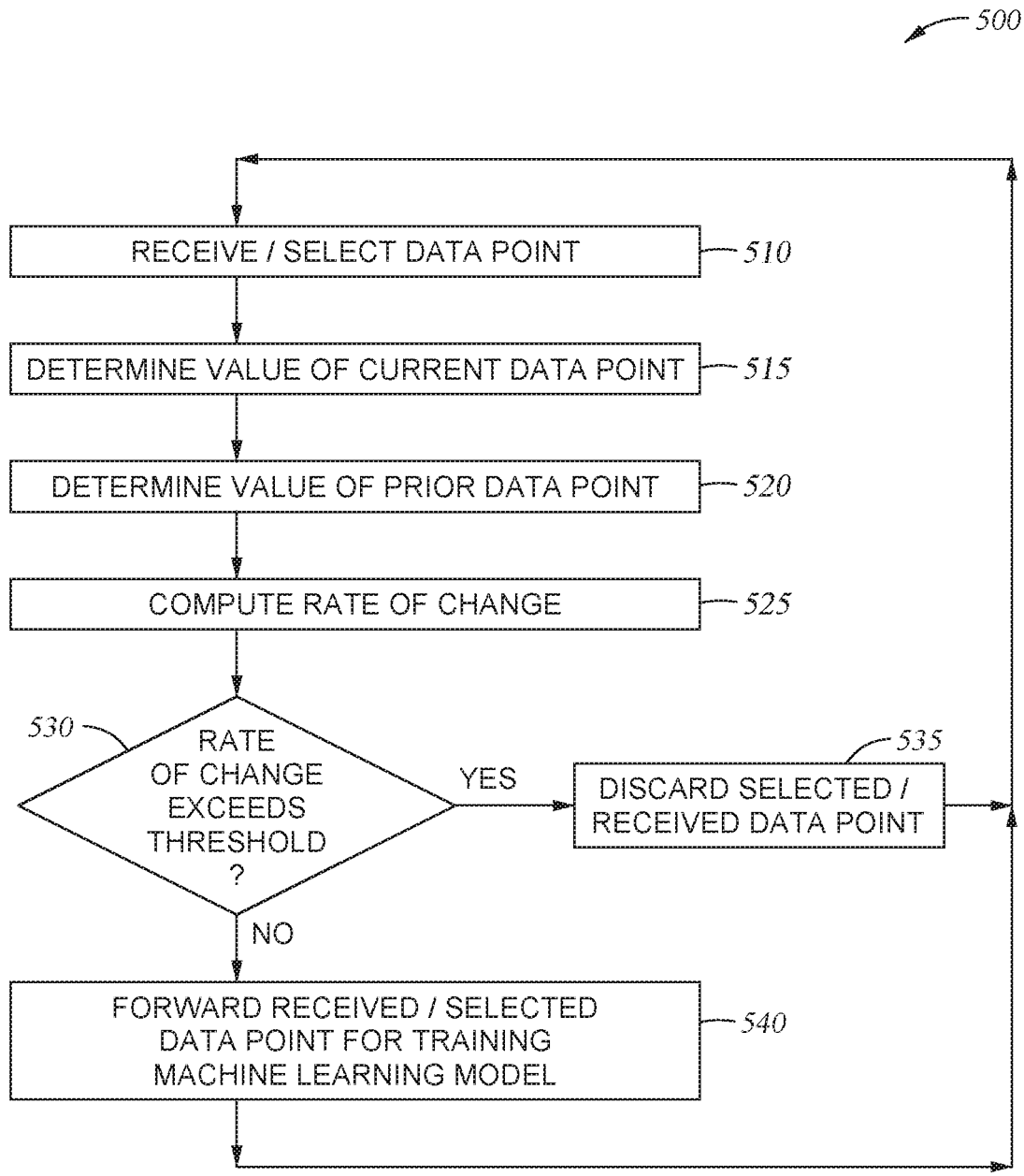
FIG. 5 is a flow diagram illustrating a method of smoothing data used to process data points based on adaptive thresholds, according to one embodiment disclosed herein.

FIG. 5 is a flow diagram illustrating a method 500 of smoothing data used to process data points based on adaptive thresholds, according to one embodiment disclosed herein. In an embodiment, the method 500 is performed separately for each KPI (e.g., for each set of time series data/each data stream). For example, in an embodiment, the data points received by the Anomaly Detection Application 230 are sorted and processed separately based on the KPI they correspond to. In embodiments, the method 500 can be utilized with batch data environments, and/or streaming data implementations. In a batch data embodiment, the Smoothing Component 235 receives multiple data points simultaneously, and processes each of them. In a data stream environment, the Smoothing Component 235 receives data points sequentially, and processes them as they are received. In some embodiments, the method 500 is utilized in combination with the method 400.

The method 500 begins at block 505, where the Smoothing Component 235 receives or selects a data point. For example, in a batch data embodiment, the Smoothing Component 235 selects one of the data points in the batch. Conversely, in a data streaming embodiment, the Smoothing Component 235 receives the next data point in the time series. The method 500 then proceeds to block 515, where the Smoothing Component 235 determines the value indicated in the current data point (e.g., the selected or received data point). At block 520, the Smoothing Component 235 additional determines the value of the prior data point. That is, in the illustrated embodiment, the Smoothing Component 235 determines the value of the data point that immediately preceded the current data point in the time series data that is being processed.

The method 500 then proceeds to block 525, where the Smoothing Component 235 determines the rate of change between the current data point and the prior data point. In an embodiment, in order to account for the magnitude of the values themselves, the rate of change is determined based in part on the values themselves, rather than simply the time that elapsed between the points. For example, suppose, the rate of change is represented by roc, the value of the current data point is represented by $v_t$, and the value of the immediately prior data point is represented by $v_{(t-1)}$. In one such embodiment, the rate of change is defined as:

$$roc = \frac{v_t - v_{(t-1)}}{v_t}.$$

In such an embodiment, the rate of change represents the change as a percentage of the data value. For example, if the first and second data values are 100 and 120, respectively, the rate of change is 16.66%. Further, if the first and second data values are 1000 and 1020, respectively, the rate of change is 1.96%. In embodiments of the present disclosure, this technique enables more accurate understanding of the underlying changes. In contrast, utilizing only the difference in values can mask whether the change is substantial or not, as compared to the ordinary value of the data.

For example, consider an embodiment where the rate of change is based on the difference between the values, as well as the amount of time that elapsed between the values, but does not depend on the values themselves. Suppose the interval between data points is one second. In an embodiment considering the interval but not the absolute values, the rate of change between two data points having values of 100 and 120 is the same as the rate of change between two data points having values 1000 and 1020. In both instances, the rate of change is 20. Utilizing this approach, however, requires users or administrators to obtain a complex understanding of the data system, and prevents automatic thresholding, as discussed below in more detail.

Once the rate of change has been determined, the method 500 proceeds to block 530, where the Smoothing Component 235 determines whether the rate of change exceeds a predefined threshold. In an embodiment, this threshold is set by a user or administrator (e.g., +/−25%). Advantageously, because the rate of change includes a percentage rather than an absolute value, the Smoothing Component 235 accounts for the ordinary state of the network, even as it changes over time. For example, suppose an ordinary value for a KPI is 100 megabytes, and the threshold is defined in absolute terms (e.g., +/−10 megabytes). If the normal or ordinary value of the KPI subsequently increases to 1000 megabytes (e.g., because of increased traffic), it is to be expected that the variance will also change. Thus, the Smoothing Component 235 may erroneously label a data point as an outlier because it is more than 10 megabytes from the previous data point, despite the fact that a 10 megabyte difference is likely to be fairly common due to the increased value of the typical data point.

If, at block 530, the Smoothing Component 235 determines that the rate of change exceeds the defined threshold, the method 500 proceeds to block 535, where the Smoothing Component 235 discards the data point. That is, in the illustrated embodiment, the Smoothing Component 235 does not use the data point for subsequent training or refinement of the Machine Learning Models 255. In some embodiments, the Smoothing Component 235 may flag this data point as an anomaly or outlier. Further, in some embodiments, in order to ensure sufficient training data, the Smoothing Component 235 generates a new value for the data point (such as via linear regression) and forwards the data for training of the model(s).

If, at block 530, the Smoothing Component 235 determines that the rate of change does not exceed the threshold, the method 500 continues to block 540, where the Smoothing Component 235 sends the received/selected data point for use in training or refining one or more Machine Learning Models 255. In this way, by smoothing the data prior to use, the models can be more accurate and useful, because the training data does not include abnormal outliers. In one embodiment, the Machine Learning Models 255 are refined or trained in batches, in order to ensure the models remain current and accurate. For example, in one embodiment, the Machine Learning Models 255 are trained or refined based on the last N time intervals, where N may be a user-defined value. The method 500 then returns to block 510, to receive/select the next data point. In a batch data environment, this process may iterate until all of the data points have been processed. In a streaming environment, the process may iterate until the data source(s) stop transmitting data, or part or all of the Anomaly Detection Application 230 is disabled or otherwise paused.

Figure 6:
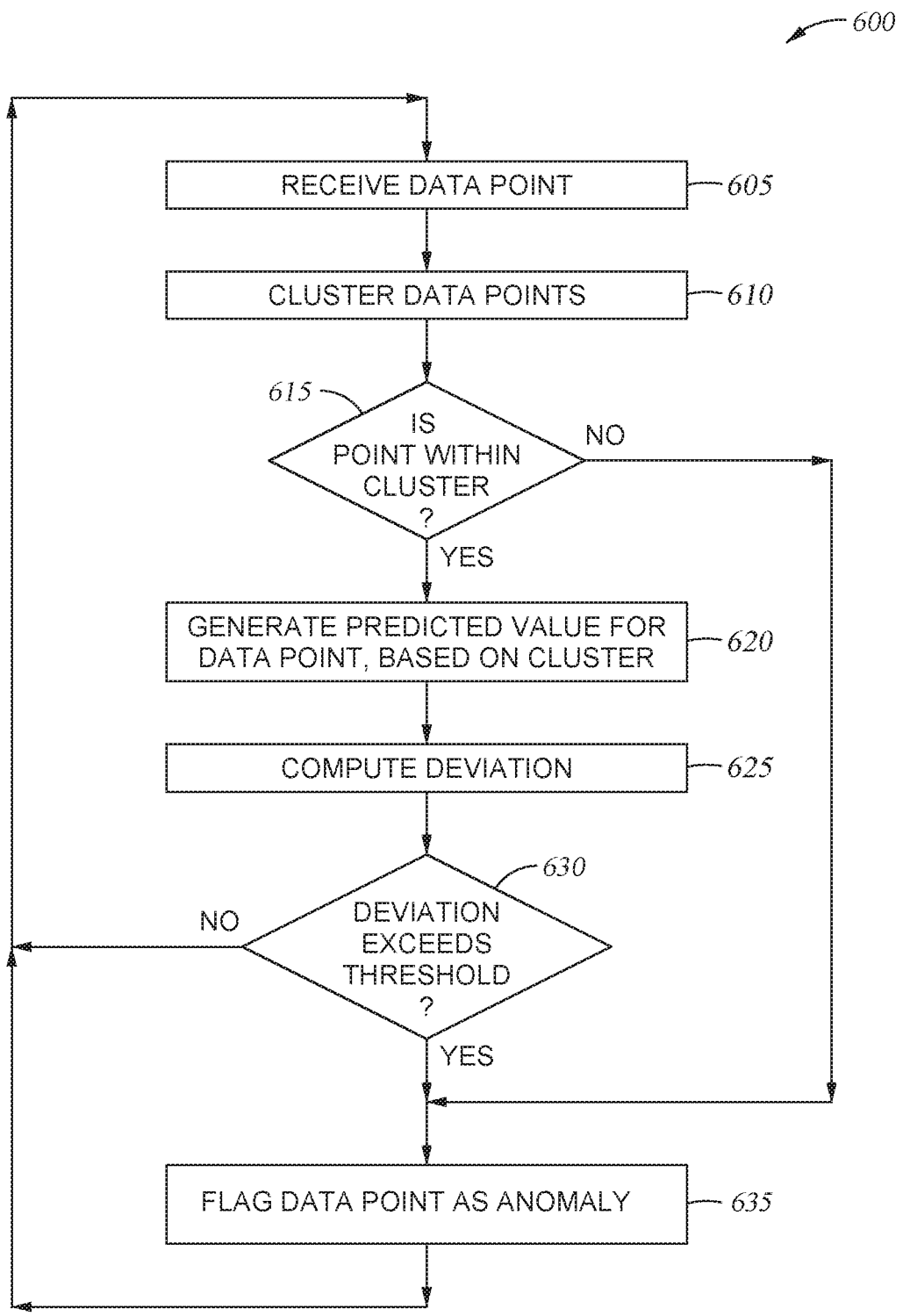
FIG. 6 is a flow diagram illustrating a method of processing data points based on adaptive thresholds utilizing clustering and machine learning, according to one embodiment disclosed herein.

FIG. 6 is a flow diagram illustrating a method 600 of processing data points based on adaptive threshold of data utilizing clustering and machine learning, according to one embodiment disclosed herein. The illustrated method 600 begins at block 605, where the Anomaly Component 250 receives a data point (e.g., in a streaming data embodiment). If a batch data environment is used, the Anomaly Component 250 selects a data point from the batch at block 605. At block 610, the Anomaly Component 250 clusters a set of data points in the time series. For example, as discussed above, in some embodiments, a Selection Component 245 selects one or more data points based on a variety of factors, such as time of day, day of the week, and the like.

In such an embodiment, the Anomaly Component 250 can generate one or more clusters based on the selected data points. In one embodiment, the Anomaly Component 250 and/or Selection Component 245 selects one or more data points associated with the same time and/or day of the week as the current data point, or data points within a predefined amount of time from the timestamp of the current data point. For example, if the current data point has a timestamp of 11:00 am on Tuesday, in one embodiment, the Anomaly Component 250 and/or Selection Component 245 selects and processes data points that also have a timestamp within a predefined amount of time before or after 11:00 am, on one or more prior days. In one embodiment, the number of days to include is defined by a user or administrator.

Additionally, in some embodiments, the selected data is further based on a defined interval of days between each day (e.g., a day of the week associated with the data) or whether the data was recorded on a weekday or weekend. For example, continuing the above example, the Anomaly Component 250 and/or Selection Component 245 may utilize data points that were also recorded on a Tuesday (or on a weekday), over a predefined number of weeks. In one embodiment, the Anomaly Component 250 utilizes a sliding window of time, such as a defined window of time T during the last N days/weeks, and, at step 610, clusters the data points included in that window. In an embodiment, the sliding window is defined based on the timestamp of the current data point. For example, if the current data point was received at 9:30 am on a Tuesday morning, the sliding window may include data points gathered from 9:00 am to 10:00 am on the last 5 Tuesdays.

Further, similarly to the above discussion, in embodiments, the method 600 is completed separately for each time series. That is, in an embodiment, each cluster includes only data points from a particular time series or data stream, which includes data for a respective KPI reflected by the respective time series. In one embodiment, the Anomaly Component 250 generates a single cluster for each such sliding window. In an embodiment, the radius of this cluster is set or defined by a user or administrator. That is, in one embodiment, the Anomaly Component 250 generates a single cluster for the data (e.g., identifies the centroid of the data points), and each data point in the set is defined as either inside or outside the cluster based on a user-defined radius.

In one embodiment, the Anomaly Component 250 utilizes an algorithm such as k-means clustering to partition the data points. For example, suppose the selected window of time corresponds to data points collected at time t (or within a predefined amount of time i before or after time t), on a defined day of the week d (e.g., any weekend, any weekday, any Tuesday, and the like), within the last n intervals (e.g., the last n days, or n weeks). Further suppose that the value of a data point collected at time t, on day d is represented by $v_{t,d}$. In such an embodiment, the set of data points to be clustered for processing the data point at $v_{t,d}$ can be represented as: kmeans ($v_{(t-i),(d-n)}$ through $v_{(t+i),d}$), with a user-defined cluster radius r.

In some embodiments, the current point may not be included in the data when clustering (e.g., the data may include points from $v_{(t-i),(d-n)}$ to $v_{(t-1),(d)}$, where t−1 indicates the data point immediately preceding the current point). Similarly, in some embodiments, the clustering only considers data points up to the current point (as data points occurring after the current point may not yet be available).

Once the cluster is defined, the method 600 proceeds to block 615, where the Anomaly Component 250 determines whether the current (e.g., the selected or received data point) is within that cluster. That is, in an embodiment, the Anomaly Component 250 determines whether the current point is within the predefined radius from the centroid of the cluster. If not, the method 600 continues to block 635, where the current data point is flagged as anomalous. In embodiments, a number of actions can be taken upon determining that a data point is an anomaly. For example, in one embodiment, an indication or alert is provided to an automated application, a user, or an administrator. This allows intelligent action to be taken to manage the system. The method 600 then returns to block 605 to process the next received data point.

If, at block 615, the Anomaly Component 250 determines that the current data point is within the cluster, the method 600 proceeds to block 620, where the Anomaly Component 250 generates a predicted value for the data point, based on the data points contained within the cluster. For example, in one embodiment, the Anomaly Component 250 processes the data points within the cluster using a Machine Learning Model 255 or linear regression, to generate a predicted value for the current data point. Advantageously, because the predicted value generated in block 620 is based on data points within the generated cluster, the value is not based on prior values that fell outside of the cluster (e.g., values that were determined to be anomalous).

Further, because the data points in the cluster correspond to a selected set of data points corresponding to one or more previous time intervals, the generated predicted value is based on data collected over one or more prior days, rather than based on data collected immediately prior to the current data point (as was the case in block 420 of FIG. 4). This can enable deeper understanding as to whether the current data point is anomalous or not. In some embodiments, the value of the current data point is not considered when generating the predicted value.

For example, suppose the selected window of time corresponds to data points collected at time t (or within a predefined amount of time i before or after time t), on a defined day of the week d (e.g., any weekend, any weekday, any Tuesday, and the like), within the last n intervals (e.g., the last n days, or n weeks). Further suppose that the actual value of a data point collected at time t on day d is represented by $v_{t,d}$, and the predicted value for the subsequent data point is represented by $Vpred_{(t+1),d}$ if the current point is just after the prior time, on the same day, or $Vpred_{t,(d+1)}$ if the current data point is at the same time t but on the subsequent interval (e.g., the subsequent day, weekday, weekend day, Monday, and the like). In one an embodiment, the predicted value can be generated based on the following equations:

$$Vpred_{(t+1),d} = \text{LinearRegression}(v_{(t-i),(d-n)} \text{ through } v_{(t),d}), \text{ and}$$

$$Vpred_{t,(d+1)} = \text{LinearRegression}(v_{(t-i),(d-n)} \text{ through } v_{(t+i),(d)}).$$

In some embodiments, the Anomaly Component 250 generates the predicted value based on one or more Machine Learning Models 255 (such as a neural network) based on various data points corresponding to the relevant KPI. For example, in one embodiment, the Anomaly Component 250 trains a Machine Learning Model 255 based on the cleaned and smoothed data points, as discussed above. In one embodiment, the Machine Learning Model(s) are used to generate a predicted value, which is then compared with new incoming real-time data from a data stream in order to determine if there are any anomalies in the new data. Similarly, in some embodiments, the data used to train the Machine Learning Model 255 is selected by the Selection Component 245 (e.g., to include only data captured during defined time window(s)). In one embodiment, generating the value for the selected data point comprises providing each data point in the cluster to the Machine Learning Model 255 as input. In one embodiment, the Machine Learning Model(s) 255 utilized in block 620 are the same model(s) utilized in block 420 of FIG. 4.

Once a predicted value has been generated for the current received/selected data point, the method 600 continues to block 625, where the Anomaly Component 250 calculate a deviation between the actual value of the current point, and the predicted value. For example, if $v_{actual}$ defines the actual value of the current data point, and $v_{pred}$ defines the predicted value, in one embodiment, the deviation is defined as:

$$\text{deviation} = \frac{v_{actual} - v_{pred}}{v_{actual}}.$$

In this way, the deviation represents the difference (as a percentage) between the predicted and actual data values for the current data point. The method 600 then continues to block 630, where the Anomaly Component 250 determines whether the computed deviation exceeds a predefined threshold (e.g., +/−25%). If not, the data point is normal or nominal (e.g., not abnormal or anomalous), and the method 600 returns to block 605 to process the next data point. Otherwise, if the threshold is exceeded, the method 600 continues to block 635, where the Anomaly Component 250 flags the data point as anomalous.

In embodiments of the present disclosure, a variety of actions can be taken based on determining that a data point is anomalous. In an embodiment, an anomalous data point indicates that network service assurance may be degrading, and may indicate a need for reallocation of computing resources (e.g., network resources). Thus, in some embodiments, upon identifying an anomalous data point, an administrator is notified. The administrator can then take action to allocate or reallocate resources, reroute traffic, and the like. Further, in some embodiments, based on identifying anomalous data, the network itself can automatically reconfigure or reallocate resources, adjust packet routing, and the like. In this way, the quality of the network can be significantly improved.

Advantageously, in embodiments of the present disclosure, the actual threshold utilized (e.g., the permissible magnitude of the change or value of each data point) is dynamically adjusted, due to the fact that embodiments disclosed herein provide techniques for determining deviation as a percentage of the actual value, rather than as a raw value. As these KPI thresholds dynamically adjust, in embodiments, they are compared against the actual KPI values received in real time, in order to facilitate the identification of abnormal or anomalous data points. This allows "ordinary" spikes or shifts in the data to be ignored, in order to focus on "true" anomalies.

In this way, embodiments of the present disclosure improve data monitoring and management of the system being monitored. That is, because the particular techniques utilized to enable the thresholds to dynamically adapt and learn based on system trends, embodiments of the present disclosure improve data monitoring and management by reducing false alerts, improving accurate detection of anomalies, and focusing management efforts where they are most needed. Further, embodiments disclosed herein improve the computing system itself (e.g., the network itself) by allowing for improved oversight and management. By dynamically and intelligently identifying anomalous data, the capabilities of the network are improved and extended, and the resulting service to end users is improved.

Figure 7:
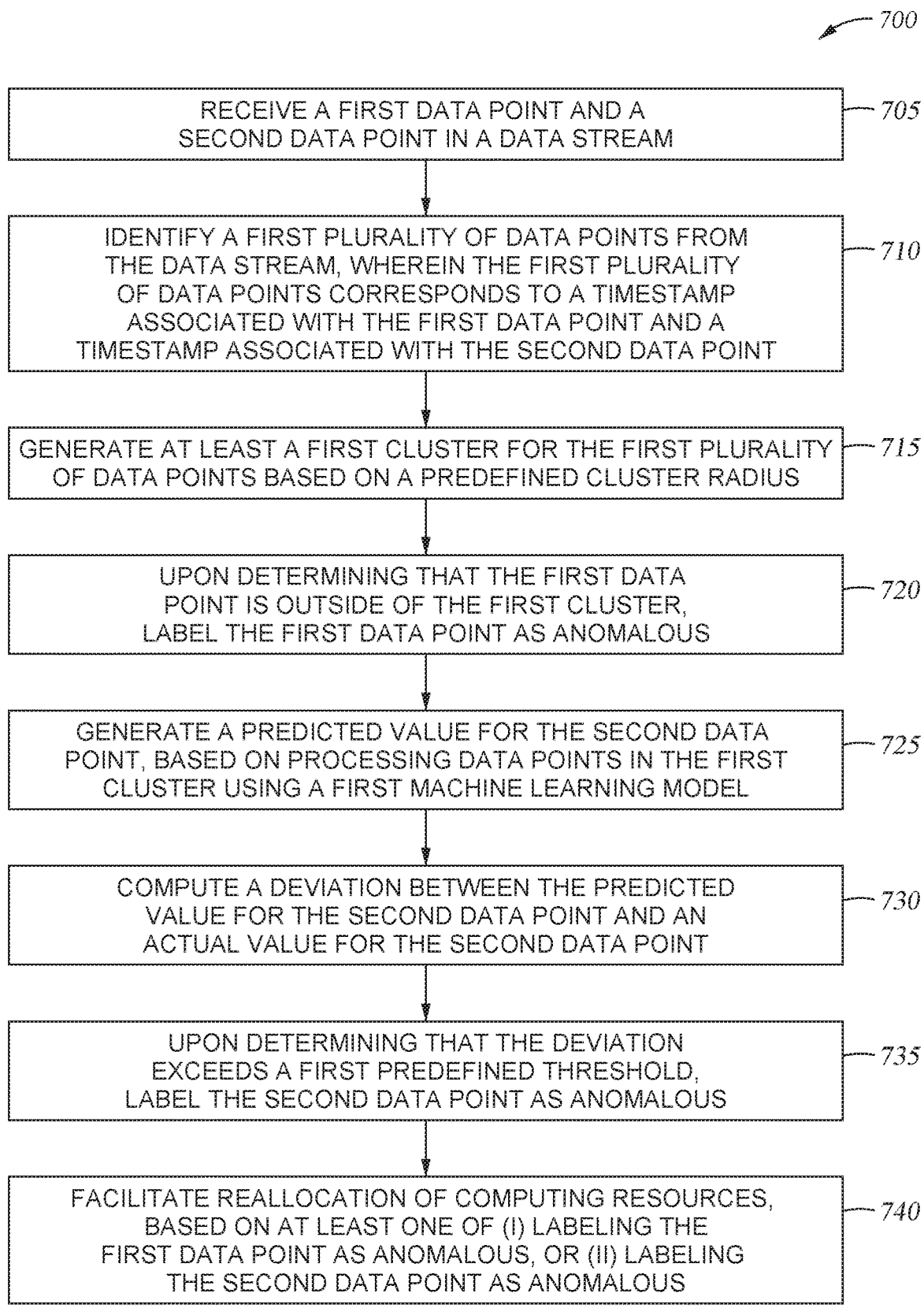
FIG. 7 is a flow diagram illustrating a method of providing adaptive thresholding for real-time data monitoring, according to one embodiment disclosed herein.

FIG. 7 is a flow diagram illustrating a method 700 of providing adaptive thresholding for real-time data monitoring, according to one embodiment disclosed herein. The method 700 begins at block 705, where the Anomaly Detection Application 230 receives a first data point and a second data point in a data stream. At block 710, the Anomaly Detection Application 230 identifies a first plurality of data points from the data stream, wherein the first plurality of data points corresponds to a timestamp associated with the first data point and a timestamp associated with the second data point. The method 700 then proceeds to block 715, where the Anomaly Detection Application 230 generates at least a first cluster for the first plurality of data points based on a predefined cluster radius. At block 720, upon determining that the first data point is outside of the first cluster, the Anomaly Detection Application 230 labels the first data point as anomalous. Additionally, at block 725, the Anomaly Detection Application 230 generates a predicted value for the second data point, based on processing data points in the first cluster using a first machine learning model. The method 700 continues to block 730, where the Anomaly Detection Application 230 computes a deviation between the predicted value for the second data point and an actual value for the second data point. Upon determining that the deviation exceeds a first predefined threshold, the Anomaly Detection Application 230 labels the second data point as anomalous at block 735. Finally, at block 740, the Anomaly Detection Application 230 facilitates reallocation of computing resources, based on at least one of (i) labeling the first data point as anomalous, or (ii) labeling the second data point as anomalous.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Anomaly Detection Application 230) or related data available in the cloud. For example, the Anomaly Detection Application 230 could execute on a computing system in the cloud and analyze data streams to identify anomalous values. In such a case, the Anomaly Detection Application 230 could train and apply machine learning models, and store historical data and models at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a first data point and a second data point in a data stream;
identifying a first plurality of data points from the data stream, wherein the first plurality of data points corresponds to a timestamp associated with the first data point and a timestamp associated with the second data point;
generating at least a first cluster for the first plurality of data points based on a predefined cluster radius;
upon determining that the first data point is outside of the first cluster, labeling the first data point as anomalous;
generating a predicted value for the second data point, based on processing data points in the first cluster using a first machine learning model;
computing a deviation between the predicted value for the second data point and an actual value for the second data point;
upon determining that the deviation exceeds a first predefined threshold, labeling the second data point as anomalous; and
facilitating reallocation of computing resources, based on at least one of (i) labeling the first data point as anomalous, or (ii) labeling the second data point as anomalous.

2. The method of claim 1, the method further comprising cleansing the data stream prior to generating the first cluster by:
analyzing a timestamp associated with each of the first plurality of data points to identify a missing data point;
generating a predicted value for the missing data point using one or more machine learning models; and
inserting a new data point, with the predicted value, into to the first plurality of data points, wherein the new data point is associated with a timestamp corresponding to the missing data point.

3. The method of claim 2, the method further comprising smoothing the data stream prior to generating the first cluster, wherein smoothing the first plurality of data points comprises, for at least one respective data point in the first plurality of data points:
determining a respective rate of change between a value of the respective data point and a value of a data point that immediately precedes the respective data point in time; and
upon determining that the respective rate of change exceeds a second predefined threshold, removing the respective data point from the first plurality of data points.

4. The method of claim 1, wherein facilitating reallocation of computing resources comprises:
upon labeling the first data point as anomalous, providing an indication of the first data point to an administrator; and
upon labeling the second data point as anomalous, providing an indication of the second data point to an administrator.

5. The method of claim 1, wherein identifying the first plurality of data points from the data stream comprises identifying one or more data points associated with a time of day matching a time of day associated with the first data point, wherein at least two of the first plurality of data points were collected on different days.

6. The method of claim 5, wherein the different days are defined based on a predefined interval between days.

7. The method of claim 1, wherein the deviation is a percentage, and wherein computing the deviation between the predicted value for the second data point and the actual value for the second data point comprises:
determining a first value corresponding to a difference between the predicted value and the actual value; and computing the deviation by dividing the first value by the actual value.

8. The method of claim 1, wherein the first plurality of data points were collected from a plurality of network devices, and wherein each respective data point of the first plurality of data points specifies a respective value for a first key performance indicator (KPI) for a respective network device of the plurality of network devices.

9. A computer program product comprising:
   a computer-readable storage medium having computer-readable program code embodied therewith, the computer-readable program code executable by one or more computer processors to perform an operation comprising:
      receiving a first data point and a second data point in a data stream;
      identifying a first plurality of data points from the data stream, wherein the first plurality of data points corresponds to a timestamp associated with the first data point and a timestamp associated with the second data point;
      generating at least a first cluster for the first plurality of data points based on a predefined cluster radius;
      upon determining that the first data point is outside of the first cluster, labeling the first data point as anomalous;
      generating a predicted value for the second data point, based on processing data points in the first cluster using a first machine learning model;
      computing a deviation between the predicted value for the second data point and an actual value for the second data point;
      upon determining that the deviation exceeds a first predefined threshold, labeling the second data point as anomalous; and
      facilitating reallocation of computing resources, based on at least one of (i) labeling the first data point as anomalous, or (ii) labeling the second data point as anomalous.

10. The computer program product of claim 9, the operation further comprising cleansing the data stream prior to generating the first cluster by:
   analyzing a timestamp associated with each of the first plurality of data points to identify a missing data point;
   generating a predicted value for the missing data point using one or more machine learning models; and
   inserting a new data point, with the predicted value, into to the first plurality of data points, wherein the new data point is associated with a timestamp corresponding to the missing data point.

11. The computer program product of claim 10, the operation further comprising smoothing the data stream prior to generating the first cluster, wherein smoothing the first plurality of data points comprises, for at least one respective data point in the first plurality of data points:
   determining a respective rate of change between a value of the respective data point and a value of a data point that immediately precedes the respective data point in time; and
   upon determining that the respective rate of change exceeds a second predefined threshold, removing the respective data point from the first plurality of data points.

12. The computer program product of claim 10, the operation further comprising smoothing the data stream prior to generating the first cluster, wherein smoothing the first plurality of data points comprises, for at least one respective data point in the first plurality of data points:
   determining a respective rate of change between a value of the respective data point and a value of a data point that immediately precedes the respective data point in time; and
   upon determining that the respective rate of change exceeds a second predefined threshold, removing the respective data point from the first plurality of data points.

13. The computer program product of claim 9, wherein facilitating reallocation of computing resources comprises:
   upon labeling the first data point as anomalous, providing an indication of the first data point to an administrator; and
   upon labeling the second data point as anomalous, providing an indication of the second data point to an administrator.

14. The computer program product of claim 9, wherein the deviation is a percentage, and wherein computing the deviation between the predicted value for the second data point and the actual value for the second data point comprises:
   determining a first value corresponding to a difference between the predicted value and the actual value; and
   computing the deviation by dividing the first value by the actual value.

15. A system comprising:
   one or more computer processors; and
   a memory containing a program which when executed by the one or more computer processors performs an operation, the operation comprising:
      receiving a first data point and a second data point in a data stream;
      identifying a first plurality of data points from the data stream, wherein the first plurality of data points corresponds to a timestamp associated with the first data point and a timestamp associated with the second data point;
      generating at least a first cluster for the first plurality of data points based on a predefined cluster radius;
      upon determining that the first data point is outside of the first cluster, labeling the first data point as anomalous;
      generating a predicted value for the second data point, based on processing data points in the first cluster using a first machine learning model;
      computing a deviation between the predicted value for the second data point and an actual value for the second data point; and
      upon determining that the deviation exceeds a first predefined threshold, labeling the second data point as anomalous
      facilitating reallocation of computing resources, based on at least one of (i) labeling the first data point as anomalous, or (ii) labeling the second data point as anomalous.

16. The system of claim 15, the operation further comprising cleansing the data stream prior to generating the first cluster by:
   analyzing a timestamp associated with each of the first plurality of data points to identify a missing data point;
   generating a predicted value for the missing data point using one or more machine learning models; and inserting a new data point, with the predicted value, into to the first plurality of data points, wherein the new data point is associated with a timestamp corresponding to the missing data point.

17. The system of claim 16, the operation further comprising smoothing the data stream prior to generating the first cluster, wherein smoothing the first plurality of data points comprises, for at least one respective data point in the first plurality of data points:

determining a respective rate of change between a value of the respective data point and a value of a data point that immediately precedes the respective data point in time; and upon determining that the respective rate of change exceeds a second predefined threshold, removing the respective data point from the first plurality of data points.

18. The system of claim 16, the operation further comprising smoothing the data stream prior to generating the first cluster, wherein smoothing the first plurality of data points comprises, for at least one respective data point in the first plurality of data points:

determining a respective rate of change between a value of the respective data point and a value of a data point that immediately precedes the respective data point in time; and upon determining that the respective rate of change exceeds a second predefined threshold, removing the respective data point from the first plurality of data points.

19. The system of claim 15, wherein facilitating reallocation of computing resources comprises:

upon labeling the first data point as anomalous, providing an indication of the first data point to an administrator; and upon labeling the second data point as anomalous, providing an indication of the second data point to an administrator.

20. The system of claim 15, wherein the deviation is a percentage, and wherein computing the deviation between the predicted value for the second data point and the actual value for the second data point comprises:

determining a first value corresponding to a difference between the predicted value and the actual value; and computing the deviation by dividing the first value by the actual value.

* * * * *

UNITED STATES PATENT AND TRADEMARK OFFICE
CERTIFICATE OF CORRECTION

PATENT NO. : 11,449,748 B2
APPLICATION NO. : 16/172724
DATED : September 20, 2022
INVENTOR(S) : Om Prakash Suthar et al.

It is certified that error appears in the above-identified patent and that said Letters Patent is hereby corrected as shown below:

On the Title Page

Item (74), in Column 2, in "Attorney, Agent or Firm", Line 1, delete "Sherdan," and insert -- Sheridan, --.

In the Specification

In Column 4, Line 35, delete "like." and insert -- like). --.

In Column 4, Line 37, delete "1106" and insert -- 110B --.

Signed and Sealed this
Fifteenth Day of November, 2022

*Katherine Kelly Vidal*

Katherine Kelly Vidal
*Director of the United States Patent and Trademark Office*